United States Patent [19]

Moser et al.

[11] 4,231,866

[45] Nov. 4, 1980

[54] RECOVERY OF ORGANIC AND AQUEOUS PHASES FROM SOLVENT EXTRACTION EMULSIONS

[75] Inventors: Kenneth W. Moser; Richard E. Siemens, both of Albany; Stanley C. Rhoads, Corvallis, all of Oreg.

[73] Assignee: The Unites States of America as represented by the Secretary of the Interior, Washington, D.C.

[21] Appl. No.: 936,465

[22] Filed: Aug. 24, 1978

[51] Int. Cl.$^2$ .............................................. B01D 15/00
[52] U.S. Cl. ................................... 210/660; 210/708; 252/324; 252/348
[58] Field of Search ............. 210/21, 23 R, 24, 39–41, 210/43, 71, 75, DIG. 5; 252/322, 324, 358, 348

[56] References Cited

U.S. PATENT DOCUMENTS

| | | | |
|---|---|---|---|
| 1,501,877 | 7/1924 | Zoul | 252/324 |
| 2,318,714 | 5/1943 | Robertson et al. | 210/43 |

FOREIGN PATENT DOCUMENTS

| | | | |
|---|---|---|---|
| 2507733 | 9/1976 | Fed. Rep. of Germany | 210/43 |
| 129217 | 1/1978 | German Democratic Rep. | 210/43 |

*Primary Examiner*—Ivars C. Cintins
*Attorney, Agent, or Firm*—William S. Brown; Donald A. Gardiner

[57] ABSTRACT

Organic and aqueous phases are separated from solvent extraction emulsions by treatment of the emulsions with diatomaceous earth at elevated temperature, whereby the emulsion-forming matter is sorbed by the diatomaceous earth.

4 Claims, No Drawings

RECOVERY OF ORGANIC AND AQUEOUS PHASES FROM SOLVENT EXTRACTION EMULSIONS

During solvent extraction of metallic constituents from aqueous solutions by conventional means, such as mixer-settlers, sludges are formed which entrap quantities of expensive solvents, as well as aqueous solutions that may contain metallic values. These sludges consist of semipermanent emulsions formed by the solvent phase, the aqueous phase, and foreign matter such as dirt, sand, silica, organic matter, air, calcium sulfate, lead or aluminum compounds, etc.

Mixer-settler solvent extraction units are particularly subject to sludge formation since the aqueous and solvent phases are repeatedly mixed and separated, with gradual accumulation of the foreign matter which promotes sludge formation. Although small amounts of sludge can be tolerated in a solvent extraction system, increasing amounts can ultimately make the mixer-settler units inoperable. Accordingly, sludge must be removed periodically in order to keep the amount at a suitably low level. Conventional means for sludge removal, such as use of a vacuum or centrifuge, have, however, generally been lacking in efficiency, economy, or convenience, and improved means for removal of sludge without significant loss of organic solvent or aqueous solutions would, therefore, improve the efficiency of the solvent extraction operation.

It has now been found, according to the process of the invention, that efficient removal of sludge, and recovery of solvent and aqueous solutions from the sludge, may be accomplished by treatment of the sludge, or sludge-bearing solution, with diatomaceous earth at a temperature of about 45° to 60° C. for a time sufficient to enable the diatomaceous earth to sorb foreign matter from the sludge, thereby enabling recovery of solvent and aqueous solution.

The diatomaceous earth is preferably employed in finely divided form, e.g., about 40 to 200 mesh. Optimum amounts will vary with the particular components of the sludge, but an amount of about 1 to 6 percent diatomaceous earth, based on the amount of sludge, usually gives good results. The diatomaceous earth is initially added with mixing, to the sludge, or sludge-bearing solution, at ambient temperature and the mixture is then heated to a temperature of about 45° to 60° C., preferably about 55° C. The mixture is maintained at this temperature, with continued mixing, for a time sufficient to permit sorption of foreign matter by the diatomaceous earth. Optimum time of treatment will again depend on the specific nature of the sludge; however, a period of about 5 to 20 minutes is usually sufficient.

The diatomaceous earth, with sorbed foreign matter, is separated from the mixture by conventional means such as filtration, thereby yielding a clear mixture of organic solvent and aqueous solution. Separation of the solvent and aqueous phases of this mixture is achieved by conventional means such as gravity separation.

The spent diatomaceous earth may be cleaned and recycled by drying and heating to about 500° to 900° C. for a period of about ½ to 2 hours, followed by grinding and screening.

The process of the invention will be more specifically illustrated by the following example:

EXAMPLE

In this example, a stable nine-month old LIX64N-kerosine-copper electrolyte sludge from a commercial copper oxide leaching-solvent extraction-electrowinning plant was broken, cleaned, and separated into clear LIX64N-kerosine and copper electrolyte solutions by treatment with diatomaceous earth. LIX64N is a commercial extractant from General Mills Chemicals Co.. It contains 46 to 50 percent $\beta$-hydroxy benzophenone oxime and 1 to 2 percent of an aliphatic $\alpha$-hydroxy oxime, with the balance being essentially kerosine, and is used for extraction of nickel and copper from ammoniacal or acid solutions by formation of metal chelates that are soluble in the kerosine diluent. The copper electrolyte solution consisted essentially of an aqueous solution of about 25 to 50 grams per liter copper in the form of copper sulfate, as well as 160–200 grams per liter sulfuric acid.

At room temperature 2.6 grams of diatomaceous earth was mixed into 100 ml of the sludge while stirring. The mixture was heated to 55° C. and maintained at that temperature for 10 minutes. The diatomaceous earth, containing the sludge-forming foreign matter, was then separated in a vacuum funnel. The resulting clear LIX64N-kerosine and copper electrolyte solutions disengaged rapidly after 5 minutes of vigorous mixing.

Although the process of the invention has been illustrated by treatment of a particular sludge containing specific organic solvent and aqueous solutions, it is not limited to these materials, but is generally applicable to treatment of sludges formed during solvent extraction of metallic constituents from aqueous solutions.

We claim:

1. A process for recovery of organic solvent and aqueous phases from solvent extraction emulsions consisting essentially of the steps of (1) admixing the emulsion with diatomaceous earth and heating the mixture to a temperature of about 45° to 60° C. for a time sufficient for the diatomaceous earth to sorb foreign matter from the emulsion, (2) separating the diatomaceous earth, with sorbed foreign matter, from the organic solvent and aqueous phases and (3) separately recovering the organic solvent and aqueous phases.

2. The process of claim 1 in which the diatomaceous earth is employed in an amount of about 1 to 6 percent, based on the weight of the emulsion.

3. The process of claim 1 in which the temperature employed in treatment with the diatomaceous earth is about 55° C.

4. The process of claim 1 in which the time of treatment with the diatomaceous earth is about 5 to 20 minutes.

* * * * *